(12) United States Patent
Zemlok et al.

(10) Patent No.: US 6,627,345 B1
(45) Date of Patent: Sep. 30, 2003

(54) BATTERY PACK

(75) Inventors: Michael A. Zemlok, Towson, MD (US); Kevin S. Agan, Fallston, MD (US); Robert Bradus, Bel Air, MD (US); Horst Grossmann, Huenfelden-Kirberg (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/536,369

(22) Filed: Mar. 28, 2000

Related U.S. Application Data
(60) Provisional application No. 60/144,018, filed on Jul. 15, 1999.

(51) Int. Cl.⁷ .................................................. H01M 2/10
(52) U.S. Cl. ......................... 429/99; 429/158; 429/159; 429/186
(58) Field of Search .......................... 429/99, 186, 158, 429/159, 178

(56) References Cited

U.S. PATENT DOCUMENTS

| | | | |
|---|---|---|---|
| 1,565,450 A | 12/1925 | Hipwell | |
| 2,768,230 A | 10/1956 | Roberts | |
| 3,615,866 A | 10/1971 | Wilke et al. | |
| 3,861,960 A | 1/1975 | Parker et al. | |
| 4,523,376 A | 6/1985 | Thibault et al. | |
| 4,761,351 A | 8/1988 | Voorn | |
| 4,806,440 A | 2/1989 | Hahs, Jr. et al. | |
| 5,096,788 A | 3/1992 | Bresin et al. | |
| 5,464,701 A | 11/1995 | Rey | |
| 5,879,833 A | 3/1999 | Yoshii et al. | |
| 5,977,746 A | 11/1999 | Hershberger et al. | |
| 6,174,618 B1 * | 1/2001 | Nishiyama et al. | ........... 429/99 |
| 6,399,238 B1 * | 6/2002 | Oweis et al. | ................ 429/99 |

FOREIGN PATENT DOCUMENTS

| | | |
|---|---|---|
| EP | 0727833 | 8/1996 |
| EP | 0875948 | 11/1998 |
| EP | 0905803 | 3/1999 |

* cited by examiner

Primary Examiner—John S. Maples
(74) Attorney, Agent, or Firm—Adan Ayala

(57) ABSTRACT

A battery pack includes a first cell having top and bottom terminals, a first support disposed on the top terminal, and a second support disposed on the bottom terminal. At least one of the first and second supports may include a rib for maintaining the first cell in place. The first and second supports may lock together. Accordingly, the first support may include a first protrusion, and the second support may include a second protrusion which engages the first protrusion. The battery pack may also include a pad disposed on at least one of the top and bottom terminals.

46 Claims, 3 Drawing Sheets

BATTERY PACK

This application claims the benefit of Provisional application No. 60/144,018, filed, Jul. 15, 1999.

FIELD OF THE INVENTION

This invention relates generally to battery packs and, more particularly, to battery packs for cordless power tools.

BACKGROUND OF THE INVENTION

Cordless products which use rechargeable batteries are prevalent throughout the workplace as well as in the home. From housewares to power tools, rechargeable batteries are used in numerous devices. Ordinarily, nickel-cadmium or nickel-metal hydride battery cells are used in these devices. Since the devices use a plurality of battery cells, the battery cells are ordinarily packaged as battery packs. These battery packs couple with the cordless devices and secure to the device. The battery pack may be removed from the cordless device and charged in a battery charger or charged in the cordless device itself.

Because multiple cells are typically used in a battery pack, it may be difficult to assemble the battery pack. It is therefore an object of this invention to provide a battery pack that is easy to assemble.

SUMMARY OF THE INVENTION

In accordance with the present invention, an improved battery pack is employed. The battery pack includes a first cell having top and bottom terminals, a first support disposed on the top terminal, and a second support disposed on the bottom terminal. At least one of the first and second supports may include a rib for maintaining the first cell in place. The rib may extend along a longitudinal axis of the first cell and/or extend substantially perpendicularly from the at least one of the first and second supports. The first and second supports may lock together. Accordingly, the first support may include a first protrusion, and the second support may include a second protrusion which engages the first protrusion. The battery pack may also include a pad disposed on at least one of the top and bottom terminals. The pad may be substantially circular. The battery pack may also include a second cell disposed between the first and second supports. The second cell may be disposed adjacent and/or separate to the first cell. The battery pack may also include a lead plate connecting the first and second cells. The lead plate may connect the first and second cells through one of the first and second supports. At least one of the first and second supports may have a hole for allowing a fluid to flow therethrough. The battery pack may also include a housing supporting the first cell and the first and second supports.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
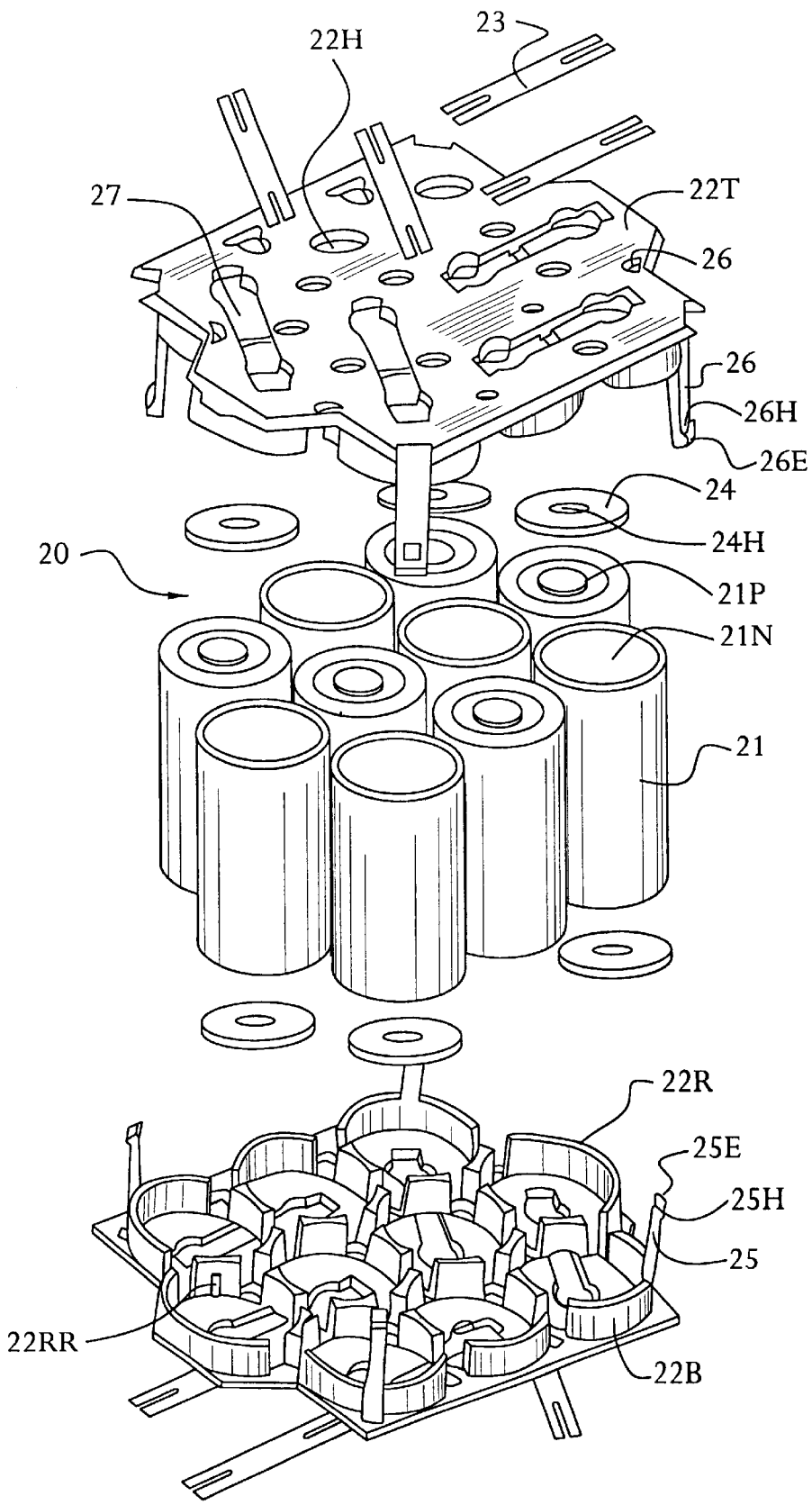
FIG. 1 is an exploded perspective view of a packet.

The invention is now described with reference to the accompanying figures, wherein like numerals designate like parts. Referring to FIGS. 1–4, a battery pack 10 of the present invention is connected to a power tool 100, such as a drill, a miter saw, a circular saw, etc. Power tool 100 may have a tool 103, such as a blade, cutting tool or bit, a motor 101 for driving tool 103, and a switch 102 for switching motor 101. Motor 101 may be electrically connected to battery pack 10.

Battery pack 10 preferably includes four battery terminals. The first battery terminal POS is the positive terminal for battery pack 10. The second battery terminal NEG is the negative/common terminal. The third battery terminal TEMP is the temperature terminal. The fourth battery terminal ID is the identification terminal. Battery terminals POS and NEG receive the charging current sent from a charger (not shown) for charging the battery pack 10.

Battery cells 21 are coupled between the battery terminals POS and NEG. In addition, preferably coupled between battery terminals TEMP and NEG is a temperature sensing device, such as a negative temperature co-efficient (NTC) resistor, or thermistor, $R_T$. The temperature sensing device $R_T$ is preferably in close physical proximity to the cells 21 for monitoring of the battery temperature. Persons skilled in the art will recognize that other components, such as capacitors, etc., or circuits can be used to provide a signal representative of the battery temperature.

A battery identification device may be connected to the ID terminal to provide battery identification information to the charger 21. Preferably, the battery identification device 17 is a resistor $R_{ID}$ connected between the ID terminal and the negative terminal NEG. The value of resistor $R_{ID}$ is preferably selected to indicate the type and capacity of battery pack 10. Because of the resistance of resistor $R_{ID}$, the charger can recognize the type and/or capacity of battery pack 10 and modify any and/or all charging parameters, such as charging voltage, current and time, in order to minimize charging time and/or avoid overcharging. For further information on battery pack 10 and the interaction with the charger, persons skilled in the art are referred to U.S. application Ser. No. 09/292,164, filed on Apr. 15, 1999, entitled "Method and Apparatus for Charging Batteries," which is hereby incorporated by reference in whole.

Figure 2:
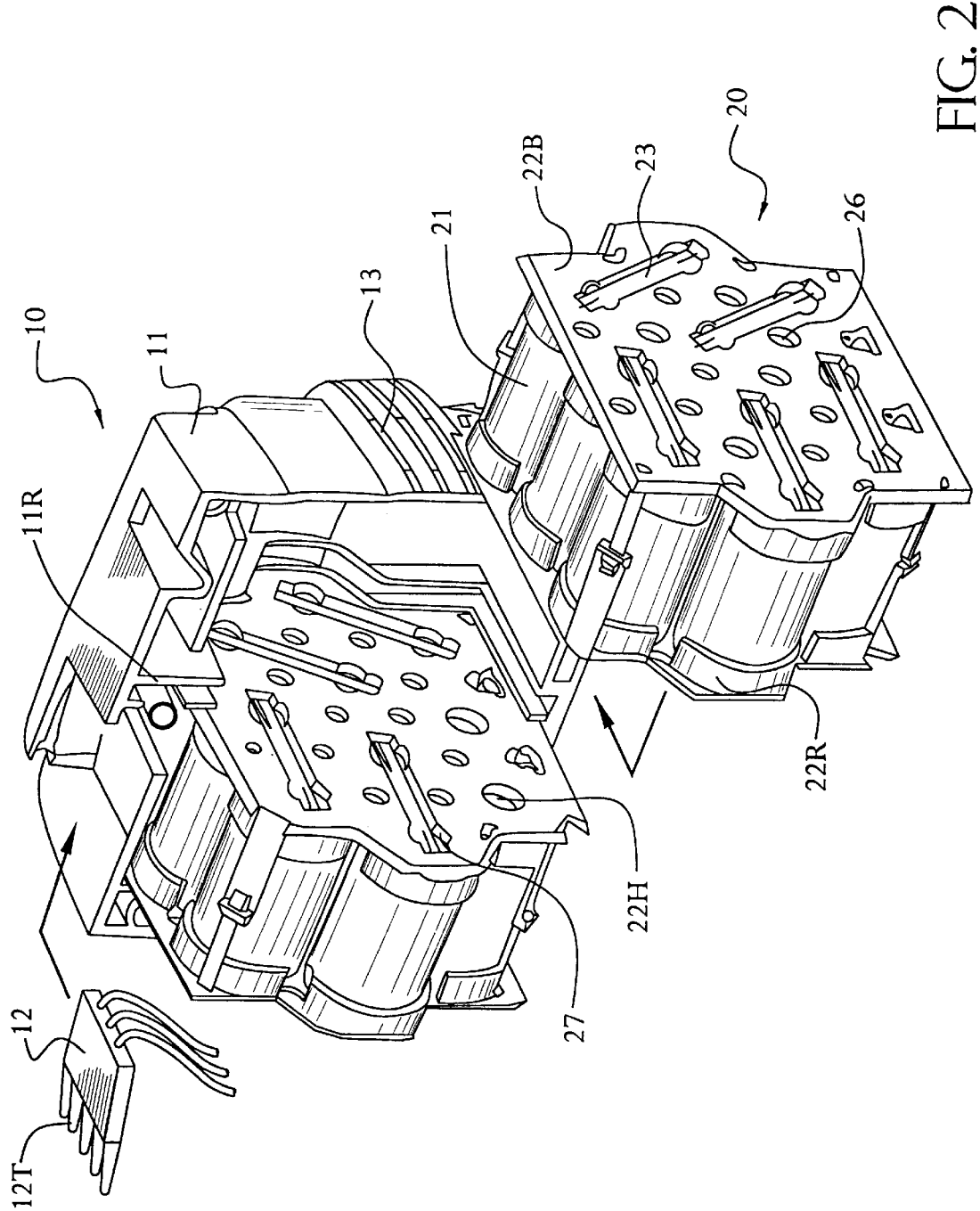
FIG. 2 is a partial exploded perspective view of a battery pack.
Figure 3:
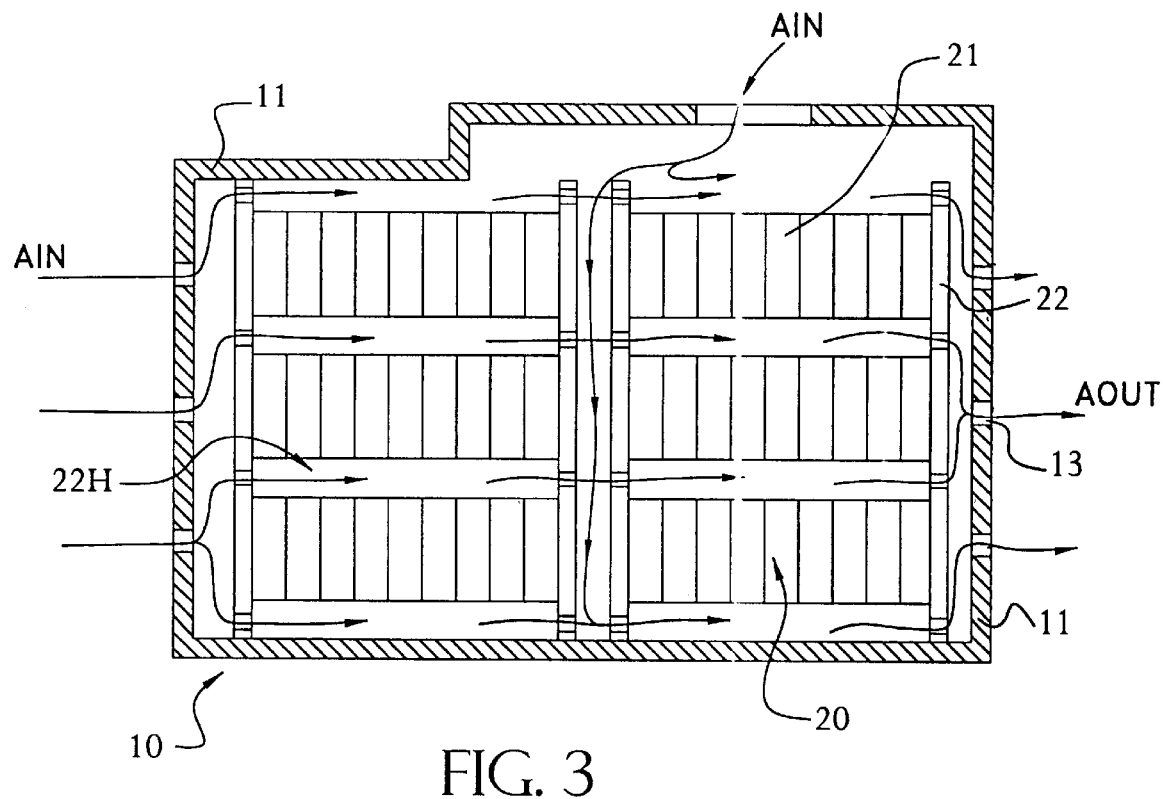
FIG. 3 is a cross-sectional side view of a battery pack.
Figure 4:
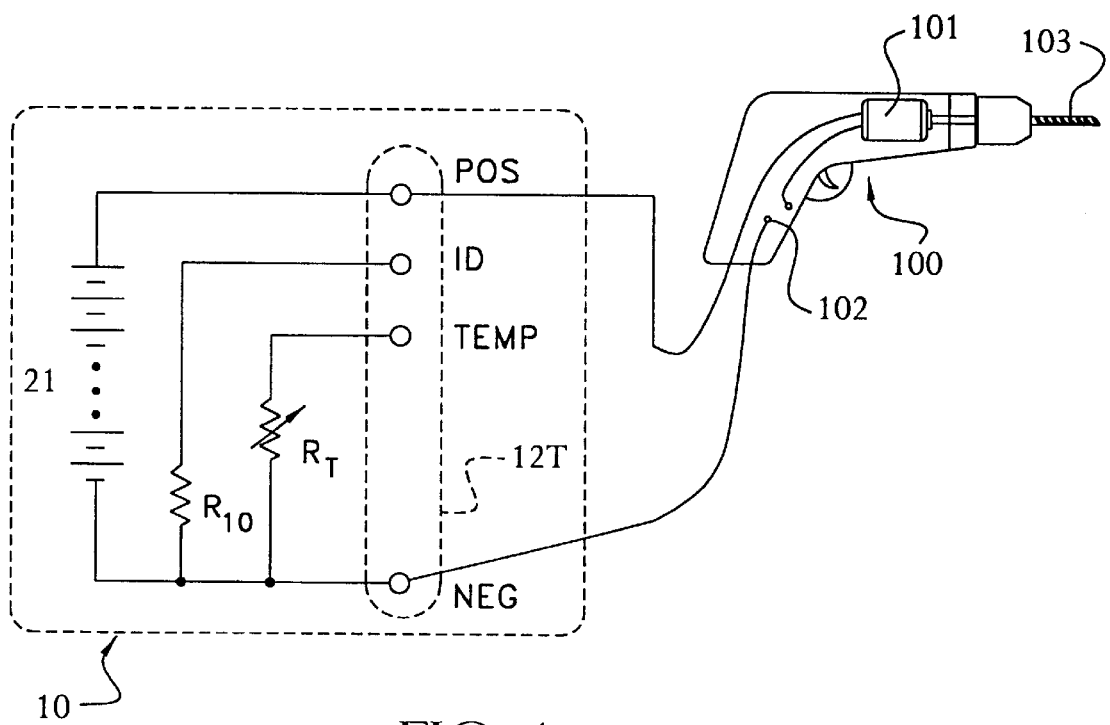
FIG. 4 is a schematic diagram of the battery pack.

Preferably, the battery pack 10 comprises at least one packet 20, as shown in FIGS. 1–3. Packet 20 may comprise at least one cell 21, and preferably a plurality of cells 21. Each cell 21 has a positive terminal 21P and a negative terminal 21N.

Top and bottom supports 22T, 22B may hold the cells 21 therebetween. Supports 22T, 22B may be substantially planar and/or substantially perpendicular to the longitudinal axis of cells 21. Preferably, the supports 22T, 22B have ribs 22R for holding the cells 21 in place and/or for holding the cells 21 apart from each other, as discussed below.

Supports 22T, 22B may have plate holes 27, exposing the positive and negative terminals 21P, 21N of cells 21. Lead plates 23 can be inserted through plate holes 27, and connected to the cell terminals by welding or some other process. If a series connection between two cells is desired, it is preferable to provide alternating terminals, i.e., the top terminal of the first cell is positive while the top terminal of the second cell is negative, in order to simplify connection with lead plates 23. Conversely, if a parallel connection between two cells is desired, it is preferable to provide the cells in the same orientation, so that the top terminals of the first and second cells are next to each other.

It is preferable to minimize movements between cells 21 relative to lead plates 23. Accordingly, a rib 22R may have a crush rib 22RR for minimizing the play between the cell 21 and rib 22R, thus limiting the movement of cell 21. Persons skilled in the art will recognize that other methods for minimizing the play between cell 21 and rib 22R may be used, such as using friction fits or springs, etc.

It may be desired to dispose pads 24 between cells 21 and supports 22. Preferably pads 24 are made of absorptive material. Pads 24 may cover part, if not all, of a cell terminal, or a vent hole, of cell 21. By disposing pads 24 accordingly, pads 24 may absorb any electrolyte which may leak from the cell 21. Preferably, pads 24 do not extend beyond the cell terminal, so as to not block holes 22H. Accordingly, pads 24 are preferably circular, and may have a radius substantially equal to or smaller than the radius of cell 21. It is preferable to dispose pads 24 only against vent holes, which may be proximate to positive terminals 21P, or against positive terminals 21P.

Supports 22T, 22B may have protrusions 25, 26 extending therefrom. Preferably protrusions 25, 26 extend substantially perpendicular to the supports 22. Protrusions 25, 26 may have respective ends 25E, 26E which engage each other. As shown in FIG. 1, end 25E has a hook portion 25H, which engages a hole 26H in end portion 26E, creating a snap-lock junction. Preferably, the junction will slightly compress or hold tightly cells 21, pads 24, etc. Persons skilled in the art will recognize that other types of junction may be used, including, for example, male-female socket junctions, friction-coupling junctions, etc.

Accordingly, to assemble a packet 20, a support, such as bottom support 22B, is provided. If pads 24 are provided for covering the positive and/or negative terminals, the pads 24 are disposed on support 22B in the appropriate pattern. Cells 21 are then disposed thereon in the desired pattern. More pads 24 may be disposed on cells 21. The other support, i.e., top support 22T, is disposed on cells 21 and/or pads 24. Both supports 22T, 22B are pushed towards each other, preferably obtaining the snap-lock junction between protrusions 25, 26. Lead plates 23 are then inserted through plate holes 27 (and through pad hole 24H, if necessary), and connected to the cell terminals.

Alternatively, a lead plate 23 can be connected to a cell 21. A pad 24 may then be disposed on cell 21. This assembly can then be installed in one of the supports 22T, 22B, where the lead plate 23 extends through plate hole 27. The lead plate 23 can then be connected to another cell 21. The other of the supports 22T, 22B is then disposed on the cells 21. Lead plates 23 are then connected accordingly.

As shown in FIG. 2, the packet 20 can then be inserted into battery pack housing 11. Preferably, housing 11 has ribs 11R to guide insertion of packet 20 into housing 11 and/or to maintain packet 20 in place. Persons skilled in the art will recognize that FIG. 2 shows a clamshell housing 11, which includes two halves, and that one of the halves is not shown. Nevertheless, persons skilled in the art will know to provide the second half, and to fixedly attach both halves together via screws, snap-lock junctions, glue, etc.

The packet 20 is preferably connected to terminal block 12, which is also disposed in housing 11. Terminal block 12 may have multiple terminals 12T, which may correspond to terminals POS, NEG, ID and/or TEMP. If multiple packets 20 are installed within housing 11, the packets 20 need to be electrically connected to each other via wires, lead plates, pressure connectors, etc., and/or to terminal block 12.

Referring to FIGS. 2–3, supports 22T, 22B may also have holes 22H, which allow a fluid, either liquid or gaseous, such as air, to flow therethrough. As mentioned above, ribs 22R are preferably used to maintain cells 21 separated. The fluid can thus flow into packet 20 through a support 22 via holes 22H, between cells 21, and out of packet 20 via holes 22H on the other support 22. Persons skilled in the art are referred to U.S. Pat. No. 6,455,186 filed Mar. 5, 1998, entitled "Battery Cooling System", which is wholly incorporated herein by reference.

It is preferable to use air as a cooling fluid. Accordingly, housing 11 is provided with holes 13, for letting air into housing 11 (airflow AIN), which flows through packets 20 as explained above, and out of housing 11 (airflow AOUT), as shown in FIG. 3. Alternatively, the air may enter through the top of battery pack 10 and exit through holes 13.

Persons skilled in the art may recognize other alternatives to the means disclosed herein. However, all these additions and/or alterations are considered to be equivalents of the present invention.

What is claimed is:

1. A battery pack comprising:
   a first cell having top and bottom terminals;
   a first support disposed on the top terminal;
   a second support disposed on the bottom terminal; and
   a material absorbent pad disposed on at least one of the top and bottom terminals, wherein a radius of said pad is substantially equal to or smaller than a radius of said first cell;
   wherein at least one of the first and second supports have a hole for allowing air to flow therethrough.

2. The battery pack of claim 1, wherein at least one of the first and second supports further comprises a rib for maintaining the first cell in place.

3. The battery pack of claim 2, wherein said rib extends along a longitudinal axis of the first cell.

4. The battery pack of claim 2, wherein the rib extends substantially perpendicularly from the at least one of the first and second supports.

5. The battery pack of claim 1, wherein a longitudinal axis of the first cell is substantially perpendicular to at least one of the first and second supports.

6. The battery pack of claim 1, wherein the first and second supports lock together.

7. The battery pack of claim 1, wherein the first support comprises a first protrusion, and the second support comprises a second protrusion which engages the first protrusion.

8. The battery pack of claim 1, wherein said pad is substantially circular.

9. The battery pack of claim 1, further comprising a second cell disposed between the first and second supports.

10. The battery pack of claim 9, wherein the second cell is disposed adjacent to the first cell.

11. The battery pack of claim 9, wherein the second cell is separated from the first cell.

12. The battery pack of claim 9, further comprising a lead plate connecting the first and second cells.

13. The battery pack of claim 1, further comprising a housing supporting the first cell and the first and second supports.

14. The battery pack of claim 13, further comprising a second cell having top and bottom terminals;
   a third support disposed on the top terminal of the second cell; and
   a fourth support disposed on the bottom terminal of the second cell,
   said second cell and third and fourth supports being disposed within the housing.

15. The battery pack of claim 13, further comprising first and second battery terminals connected to the first cell.

16. The battery pack of claim 13, wherein the housing comprises at least one hole for allowing a fluid to flow therethrough.

17. The battery pack of claim 16, wherein the fluid is air.

18. A packet for a battery pack comprising:

a first cell having top and bottom terminals;

a first support disposed on the top terminal;

a second support disposed on the bottom terminal; and a material absorbent pad disposed on at least one of the top and bottom terminals, where a radius of said pad substantially equal to or smaller than a radius of said first cell;

wherein at least one of the first and second supports have a hole for allowing air to flow therethrough.

19. The packet of claim 18, wherein at least one of the first and second supports further comprises a rib for maintaining the first cell in place.

20. The packet of claim 19, wherein said rib extends along a longitudinal axis of the first cell.

21. The packet of claim 19, wherein the rib extends substantially perpendicularly from the at least one of the first and second supports.

22. The packet of claim 18, wherein a longitudinal axis of the first cell is substantially perpendicular to at least one of the first and second supports.

23. The packet of claim 18, wherein the first and second supports lock together.

24. The packet of claim 18, wherein the first support comprises a first protrusion, and the second support comprises a second protrusion which engages the first protrusion.

25. The packet of claim 18, wherein said pad is substantially circular.

26. The packet of claim 18, further comprising a second cell disposed between the first and second supports.

27. The packet of claim 26, wherein the second cell is disposed adjacent to the first cell.

28. The packet of claim 26, wherein the second cell is separated from the first cell.

29. The packet of claim 26, further comprising a lead plate connecting the first and second cells.

30. A cordless power tool comprising:

a tool;

a motor driving the tool; and a battery pack electrically connected to the motor, the battery pack comprising a first cell having top and bottom terminals, a first support disposed on the top terminal, a second support disposed on the bottom terminal, and a material absorbent pad disposed on at least one of the top and bottom terminals, where a radius of said pad is substantially equal to or smaller than a radius of said first cell, wherein least one of the first and second supports have a hole for allowing air to flow therethrough.

31. The power tool of claim 30, wherein at least one of the first and second supports further comprises a rib for maintaining the first cell in place.

32. The power tool of claim 31, wherein said rib extends along a longitudinal axis of the first cell.

33. The power tool of claim 31, wherein the rib extends substantially perpendicularly from the at least one of the first and second supports.

34. The power tool of claim 30, wherein a longitudinal axis of the first cell is substantially perpendicular to at least one of the first and second supports.

35. The power tool of claim 30, wherein the first and second supports lock together.

36. The power tool of claim 30, wherein the first support comprises a first protrusion, and the second support comprises a second protrusion which engages the first protrusion.

37. The power tool of claim 30, wherein said pad is substantially circular.

38. The power tool of claim 30, further comprising a second cell disposed between the first and second supports.

39. The power tool of claim 38, wherein the second cell is disposed adjacent to the first cell.

40. The power tool of claim 38, wherein the second cell is separated from the first cell.

41. The power tool of claim 38, further comprising a lead plate connecting the first and second cells.

42. The power tool of claim 30, further comprising a housing supporting the first cell and the first and second supports.

43. The power tool of claim 42, further comprising a second cell having top and bottom terminals;

a third support disposed on the top terminal of the second cell; and a fourth support disposed on the bottom terminal of the second cell, said second cell and third and fourth supports being disposed within the housing.

44. The power tool of claim 42, further comprising first and second battery terminals connected to the first cell.

45. The power tool of claim 42, where in the housing comprises at least one hole for allowing a fluid to flow therethrough.

46. The power tool of claim 45, wherein the fluid is air.

* * * * *